United States Patent Office 2,797,672
Patented July 2, 1957

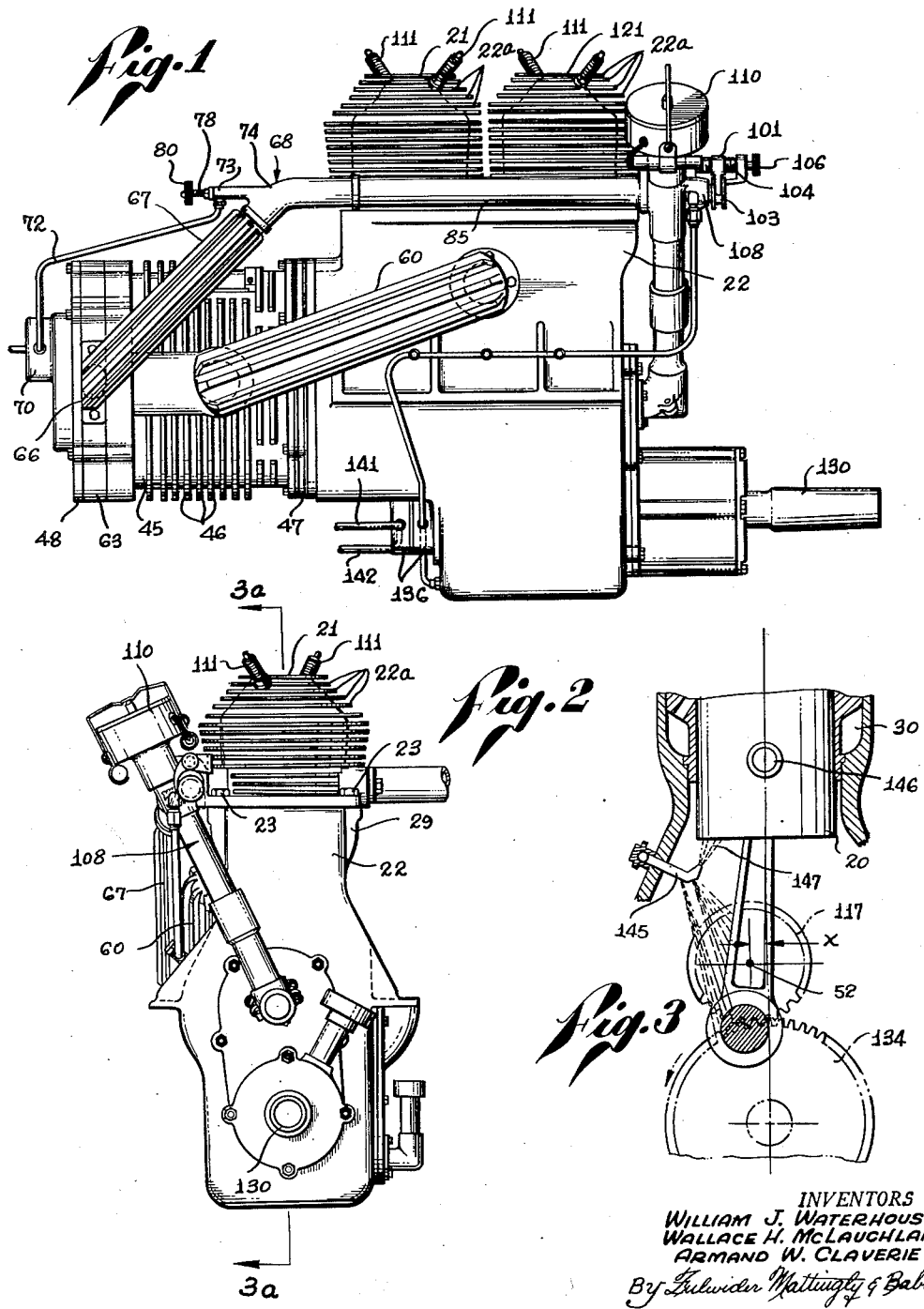

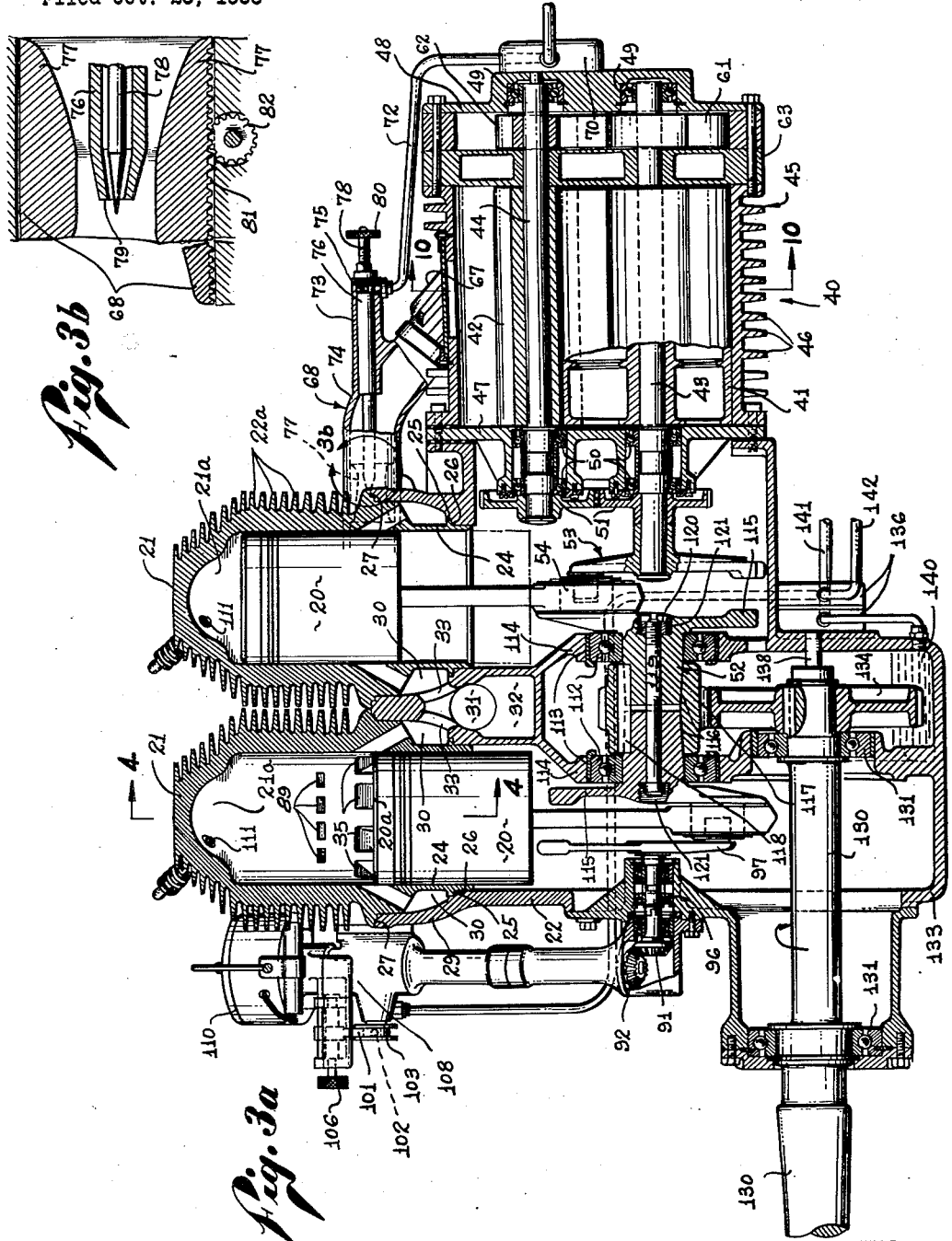

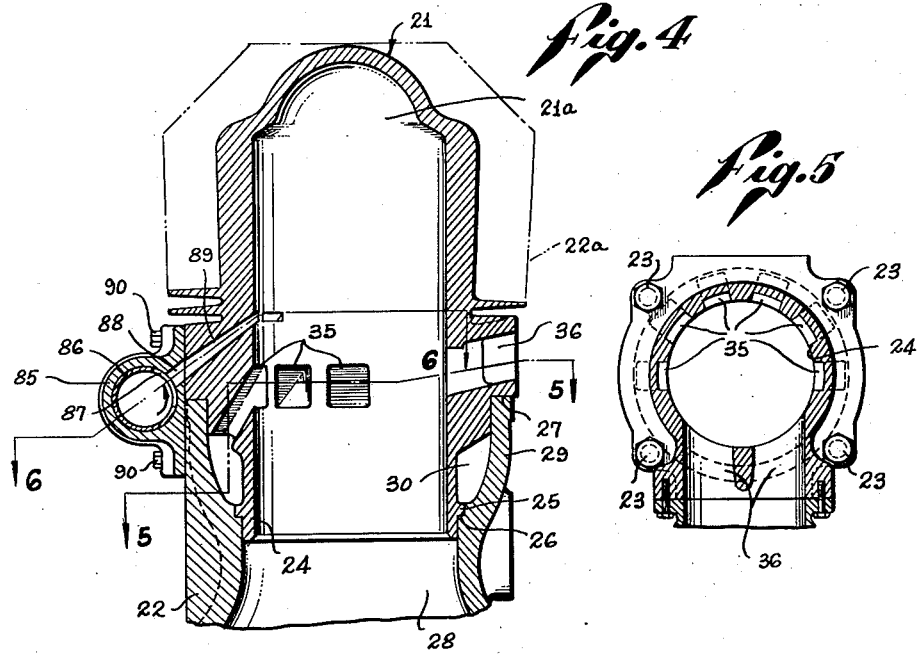
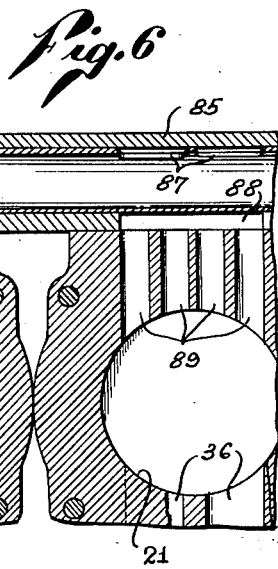
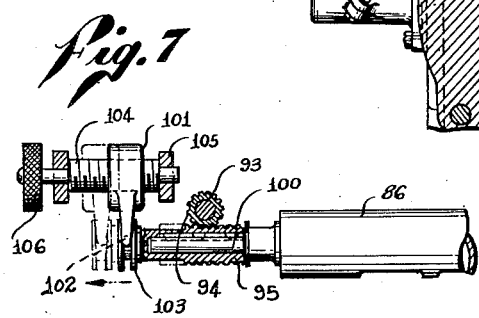

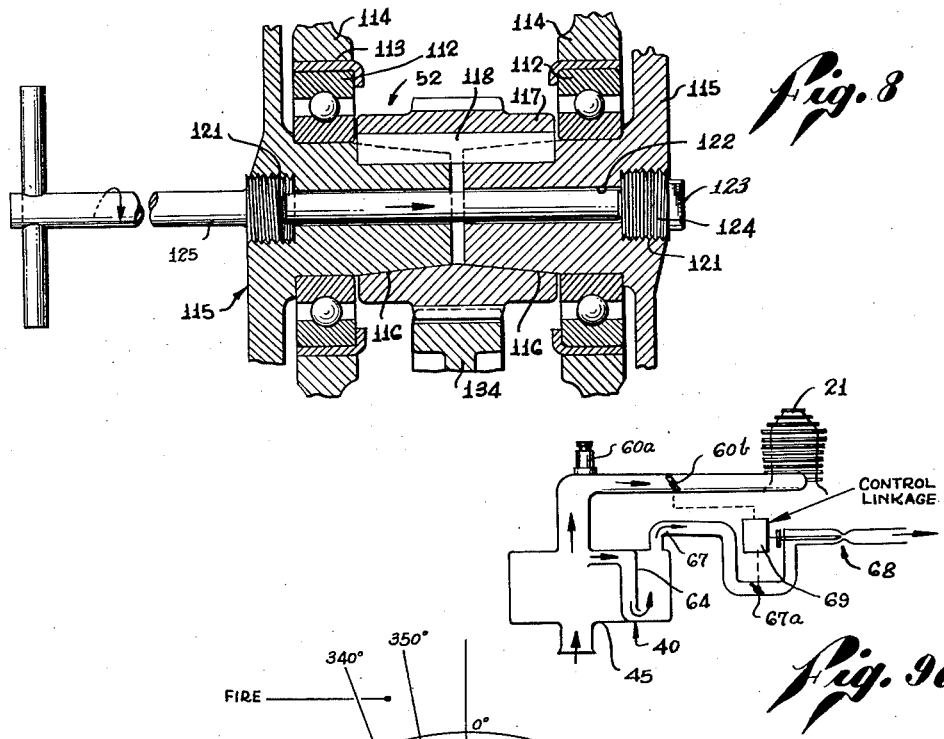
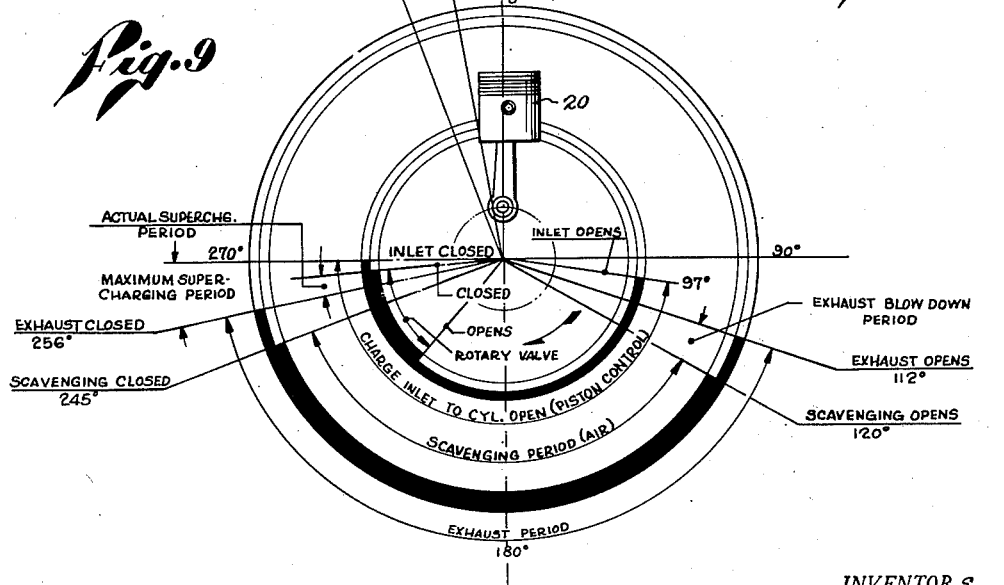

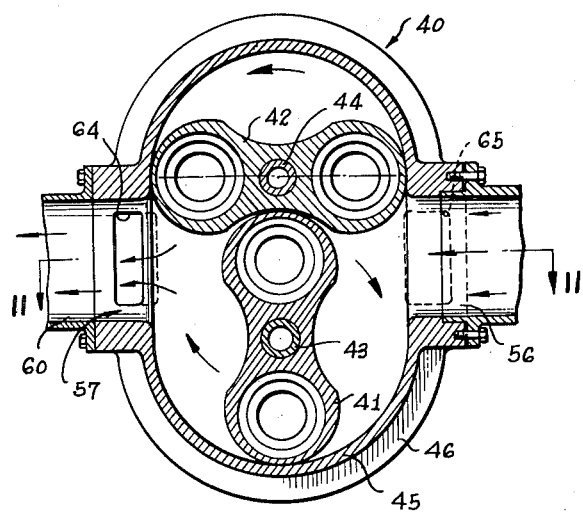
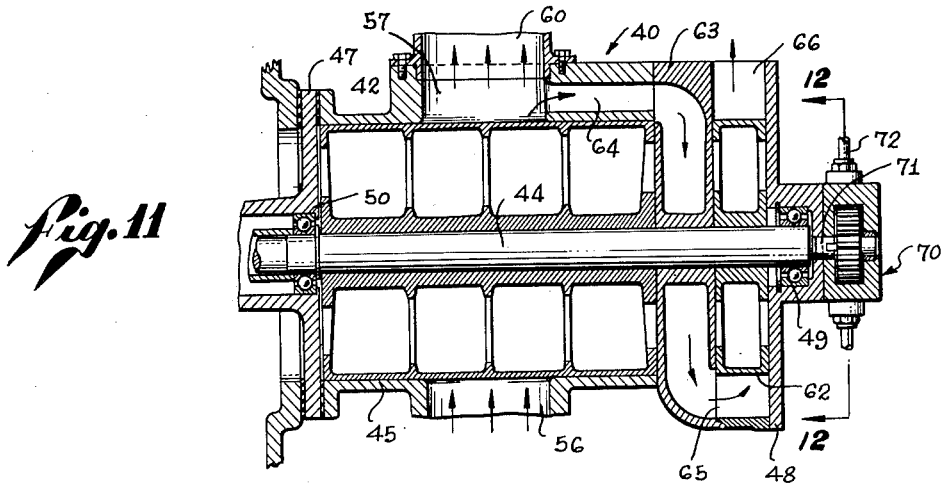
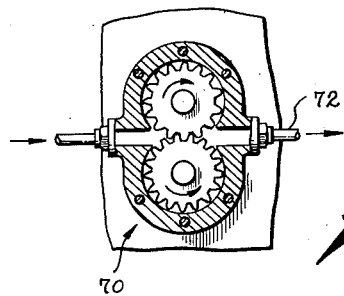

2,797,672

TWO-STROKE-CYCLE INTERNAL COMBUSTION ENGINE

William J. Waterhouse, Santa Monica, Wallace H. McLauchlan, Los Angeles, and Armand W. Claverie, Santa Monica, Calif., assignors to Technical Engineering Service, Inc., Los Angeles County, Calif., a corporation of California Application October 23, 1953, Serial No. 387,941

4 Claims. (Cl. 123—65)

The present invention relates generally to internal combustion engines, and more particularly, to a two-stroke-cycle engine of the type in which air for scavenging, fuel injectors, and supercharging is supplied by an external blower.

While the present invention and engines embodying the same are useful in a wide variety of different applications, they are particularly applicable in the field of light aircraft engines, as for example, those used in pilotless target planes. For that reason, the invention will be illustrated herein as embodied in a light aircraft engine. It will be realized, however, that the invention is not limited to the particular engine illustratively shown, but has a considerably broader application, as will be defined in the scope of the later appended claims.

Bearing in mind the problems of light pilotless aircraft and the general efficiency of internal combustion engines, it is a major object of the present invention to provide a highly efficient, lightweight, internal combustion engine designed and adapted to be controlled by a single master control so as to provide automatic synchronization and eliminate the necessity for numerous separate adjustments of the engine during changing conditions of operation.

A further object of the invention is to provide an engine of the class described which is readily assembled and disassembled for servicing, adjustment, repair, and the like.

Still another object of the invention is to provide an engine of the class described which is relatively low in initial cost and maintenance.

An additional object of the invention is to provide improved starting and part-throttle operation in a two-stroke-cycle engine.

A still further object is to provide an engine capable of faster acceleration than heretofore attainable.

A further object is to eliminate carburetor icing encountered in engines of previous design.

Yet another object is to eliminate the "vapor lock" tendency of some prior engines of similar design.

An additional object of the invention is to provide a blower arrangement for use in combination with a two-stroke-cycle internal combustion engine which is subsantially increased in efficacy as compared to blowers employed for similar purposes heretofore.

It is still another object of the invention to provide means for improved heat dissipation in an air-cooled engine.

Another object of the present invention is to provide in a two-stroke-cycle engine, an improved scavenging system by which a relatively high percentage of exhaust gas is removed from the cylinder after each firing thereof.

An additional object of the invention is to provide vaporization and fuel injection means in a two-stroke-cycle engine which makes possible the use of low grade hydrocarbon fuels, or alternatively, a higher compression ratio without knocking.

An additional object is to provide a two-stroke-cycle engine having a volumetric efficiency substantially improved over similar engines heretofore available.

A still further object of the invention is to provide a two-stroke-cycle internal combustion engine of increased combustion efficiency and resulting fuel economy.

It is a further object of the invention to provide means for effecting a substantial degree of supercharging in a two-stroke-cycle engine.

The foregoing and additional objects and advantages of the invention will be apparent from the following detailed description of the illustrative embodiment, consideration being given likewise to the attached drawings, in which:

Figure 1 is a side elevational view of a two-stroke-cycle, air-cooled aircraft engine embodying the present invention;

Figure 2 is a front elevational view of the engine shown in Figure 1;

Figure 3 is an enlarged fragmentary internal view showing a piston, drive assembly, and lubrication system;

Figure 3a is an enlarged elevational section taken on the line 3a—3a in Figure 2;

Figure 3b is an enlarged fragmentary section of a portion of Figure 3a, indicated by the arrow 3b;

Figure 4 is a further enlarged section taken on the line 4—4 of Figure 3a;

Figure 5 is a reduced section taken on the line 5—5 in Figure 4;

Figure 6 is a fragmentary, partially oblique section taken on the line 6—6 of Figure 4;

Figure 7 is an oblique, partially sectioned, fragmentary view of portions of Figure 6, illustrating a valve-adjusting assembly therein;

Figure 8 is an enlarged portion of Figure 3a, illustrating a disassembly procedure for removing the crankshaft from the engine;

Figure 9 is a diagrammatic illustration of the sequence of operations of the engine;

Figure 9a is a diagrammatic illustration of the overall assembly showing the relationship of the compressor fuelizer and engine;

Figure 10 is an enlarged elevational section taken on the line 10—10 in Figure 3a;

Figure 11 is a horizontal section taken on the line 11—11 in Figure 10;

Figure 12 is an enlarged elevational section taken on the line 12—12 in Figure 11; and Figure 12a is a perspective view of a coupling member employed in the construction of Figure 11.

The illustrative engine embodying the present invention is a two-stroke-cycle, air-cooled aircraft engine, employing an external blower for the compression of scavenging air and fuel mixture, and having a speed reduction gear drive from the crankshaft to the main power shaft. In the interests of orderly presentation, the following detailed description of the engine shown in Figure 1 will be divided into the following general subjects:

1. Piston, cylinder assembly, and scavenging
2. Blower, drive, and manifolding
3. Fuel introduction and valve design
4. Ignition system
5. Crank and drive shaft design
6. Operation in general
7. Supercharging

Piston, cylinder assembly, and scavenging

For a description of the piston and cylinder design, and the porting arrangements, reference should be had to Figures 3, 3a, 4, 5 and 6. The shape and relative size of the pistons, identified by the reference character 20, are best seen in Figure 3a. It will be noted that, contrary to the usual two-stroke-cycle piston design, the pistons in the present engine are flat on their upper surfaces. The flat piston design has been found to give improved scavenging and cooling when employed with the particular port arrangement of the present invention. The operation of this arrangement will be described in some detail later herein.

The engine includes a main block 22 which is formed with a pair of parallel vertical bores 28 in which a pair of cylinders 21 is received, and the upper end of each bore 28 is enlarged as indicated at 29 whereby to leave an annular plenum chamber 30 surrounding each of the cylinders 21.

The cylinders are fabricated as separate, but identical individual units, identified by the reference character 21 in the drawings, and are inserted in the bores 28 as stated, being secured therein by cap screws 23, as shown in Figure 2. The cylinders are each formed with a dome-like combustion chamber 21a of such dimensions as to provide a compression ratio of about 1:7. It will be realized that the compression ratio given is not an essential limitation of the design and that engines having other ratios and dimensions may fall within the scope of the present invention as defined by the appended claims.

As can be seen best in Figures 3 and 4, each cylinder 21 is formed with a downwardly extending skirt portion 24 having an external flange 25 thereon, positioned and adapted to abut a shoulder 26 formed in the engine block 22. A similar shouldered abutment is also formed further upon the cylinder and disposed outwardly of the skirt 24, as indicated at 27 in Figure 4, so that the plenum chambers 30 are defined by the skirts 24 and the block 22. The upper portion of each cylinder 21 is formed with conventional cooling fins 22a. Compressed air for scavenging the cylinders is introduced into the two plenum chambers 30 through an induction passageway 31 extending inwardly through the side of the main engine block 22 into a chamber 32 positioned between the two bores 28 whence air may pass upwardly through apertures 33 into the annular plenum chambers 30.

Each of the plenum chambers 30 is communicated with the interior of its respective cylinder by a plurality of rectangularly cross-sectioned, upwardly inclined scavenging passageways 35. From an examination of Figure 3a, it will be seen that, as the piston 20 moves downwardly in the cylinder 21 across the upper openings of the passageways 35, the same are progressively opened, permitting compressed air from the plenum chambers 30 to escape into the cylinder 21. One advantage of the plenum chamber arrangement shown is that the lower skirt portions 24 of the cylinders are cooled by the continuous influx of relatively cool air passing through the plenum chambers. Such air being under pressure has greater heat absorbing capacity than air at ordinary atmospheric pressure.

Each cylinder is formed with a pair of exhaust ports 36, diametrically opposite the center of the group of scavenging passageways 35. In Figure 4, it can be seen that the top edges of the exhaust ports 36 are slightly above the top edges of the openings of the scavenging passageways 35 whereby as the piston moves downwardly, the exhaust ports are open before scavenging air is admitted to the cylinder.

From a consideration of Figure 3a, it will be seen that, due to a slight chamfer 20a at the top of the piston 20, the initial cracking of the scavenging passageways 35 results in a relatively high velocity stream of air being ejected from each of the passageways 35, such high velocity stream being directed generally toward the upper end of the cylinder 21. The initial "loop" or arched path of the scavenging air stream is also caused in part by the fact that the passageways are distributed in an arc circumferentially around the cylinder. Thus the streams of air from the passageways at the ends of the arc impinge on each other when at high velocity and combine to create a highly turbulent upward stream.

As the piston 20 continues to move downwardly, the exposed area of the scavenging passageway increases, thus lowering the velocity of the influx of scavenging air and also directing the same more laterally across the cylinder. As the piston passes bottom dead center and moves back up the cylinder, the sweep of the scavenging air stream swings back upwardly and reestablishes the loop pattern above-referred to. The result of the foregoing arrangement is that the scavenging air stream sweeps out the entire volume of the cylinders, including the combustion chambers 21a, rather than passing directly across the cylinder and out the exhaust ports.

A further advantage in the "loop scavenging" or sweeping air stream just described is that during the time the air is moving substantially horizontally across the chamber, the piston head is subjected to a vigorous "scrubbing" action which adds materially to the cooling thereof.

Blower, drive, and manifolding

The interconnections of the blower and engine are shown in Figure 9a. Compressed air for the scavenging operation just described and also for the air-fuel mixture is supplied by a two-stage Roots blower, indicated generally in the drawings by the reference character 40. The Roots type blower shown here is presently preferred, although other types may be used in the combination described herein. The first stage section of the blower includes a pair of intermeshed impellers 41 and 42 mounted on parallel longitudinal shafts 43 and 44 and having a generally dumbbell-shaped cross-section, best seen in Figure 10.

The impellers 41 and 42 operate within a generally oval cylinder-shaped casing 45, provided with cooling fins 46, and which is mounted on the rearward end of the engine, as can be seen best in Figure 3a. The shafts 43 and 44 of the impellers 41 and 42 are journaled in cover plates or end bells 47 and 48 of the housing 45, ball bearings being provided as indicated at 49 and 50. The forward ends of the shafts 43 and 44 project beyond their journal bearings 50 into the interior of the block 22, and having intermeshing gears 51 keyed thereto, whereby to synchronize the operation of the impellers 41 and 42. The lowermost shaft 43 is coaxial with the main crankshaft 52 of the engine, and carries a drive crank 53 which is received in a coaxial socket within the adjacent main crank pin 54, whereby the blower 40 is driven by the main engine.

As can be seen in Figure 10, counter-clockwise rotation of the upper impeller 42 and the corresponding clockwise rotation of the lower impeller 41, causes air to be drawn in through an influx port 56 at the right of the figure, and after passing through the blower, a portion of the flow is diverted through the passageway 64 to the second stage of the blower, while the balance enters the duct 60 leading to the plenum chamber surrounding the lower extremities of the cylinders. The first stage discharge pressure in the present embodiment is maintained at about 7½ pounds above atmospheric.

The second stage of the blower 40 comprises a second pair of impellers 61 and 62, mounted on the same shafts 43 and 44 with the first stage impellers 41 and 42. The second stage housing is an extension of the first stage housing 45, separated therefrom by a hollow partition 63. The volumetric displacement of the second stage blower is, in the present case, about 10 percent of that of the first stage.

Operation of the second stage blower further compresses the air from its pressure at the discharge port 57 and delivers the same at a higher pressure at a high pressure discharge port 66. The second stage pressure in the present instance is about 15 pounds above atmospheric. From the high pressure discharge port 66, the high pressure air is delivered through a diagonally disposed conduit 67 to the intake of a fuelizer 68, wherein it is mixed with fuel, as will be later described.

Since the capacity of the blower is calculated to maintain the maximum full throttle sea-level power up to a specified altitude, an excess of air will be available at lower altitudes. To eliminate unnecessary pumping losses, an automatic altitude pressure relief valve 60a is provided on the downstream side of the blower, to avoid building up pressures in excess of those required in the scavenging and fuel-air processes at full throttle at any altitude. Such control is accomplished by a conventional barometric pressure sensing element (not shown), which is connected to operate the valve 60a.

The flow of scavenging air to the engine is controlled by a throttle valve 60b placed between the relief valve and the plenum chamber, while the fuel-air to the fuelizer 68 is controlled in like manner by valve 67a located between the secondary blower outlet and the fuelizer. It is thus seen that restricting the flow by either of these throttle valves will increase the pressure on the relief valve 60a and cause it to open sufficiently to relieve the load on the blower.

*Fuel introduction*

While various types of fuel introducing means have been found effective when used with the present engine, a presently preferred design (termed herein a "fuelizer") found to give exceptionally good fuel mixture characteristics, is illustrated herein and indicated generally by the reference character 68. Details of the fuelizer are best seen in Figures 3a and 3b. Liquid hydrocarbon fuel, such as gasoline, is fed under pressure (about 20 p. s. i. (gage) in the present embodiment) by a fuel pump 70 mounted on the rearward end of the blower 40, and driven by a universal coupling member 71 (see Figure 12a) by the upper blower shaft 44. The fuel pump 70 is a conventional gear pump and accordingly no further detailed description thereof is deemed necessary herein.

Fuel under pressure is delivered through a conduit 72 to the rearward end of a rearwardly projecting boss 73 formed in the casing 74 of the fuelizer 68. From the delivery conduit 72, fuel passes through lateral apertures 75 into a hollow fuel delivery nozzle or jet 76 whence it passes forwardly for discharge into the air stream at the forward end of the nozzle 76.

Disposed within the horizontal stretch of the elbow-shaped bore of the fuelizer 68 and generally surrounding the forward end of the nozzle 76 is a movable Venturi member 77, the purpose of which is to increase the air stream velocity and to decrease the air pressure surrounding the end of the fuel nozzle 76. We have found that the atomization of fuel is greatly enhanced if the liquid fuel is injected into an air stream moving at a relatively high velocity. The rate at which fuel is delivered from the end of the nozzle 76 may be controlled and adjusted by an internal coaxial valve needle 78 which cooperates with a bore reduction 79 in the forward end of the nozzle 76. Adjustment of the needle 78 is accomplished by a hand knob 80 carried on the rearward end thereof.

When the present engine is operating at partial throttle openings and the volume of air per second moving through the fuelizer is accordingly reduced, it is desired nevertheless to maintain a high velocity of air at the discharge end of the nozzle 76. To this end, the Venturi 77 is slidable within the bore of the fuelizer 68 and adjustable therein by means of a rack 81 formed therein and in mesh with a manually rotatable pinion 82. Thus, it will be seen that by moving the Venturi 77 with respect to the stationary nozzle 76, the throat of the Venturi may be restricted to a greater or less degree as desired. When the total volume of air per second moving through the fuelizer is low, therefore, the Venturi is moved to a position where there is a greater restriction in the throat due to the presence of the jet therein, thus keeping the air stream velocity high.

From the fuelizer 68, the air-fuel mixture passes into a longitudinally extending tubular manifold 85 having a relatively closely fitting tubular sleeve valve 86 rotatably carried therein. The sleeve valve 86 carries a stub drive shaft 100 and is formed with lateral ports 87, positioned to align intermittently with apertures 88 in the manifold 85. The latter apertures are in turn aligned with fuel injection passageways 89 formed in the cylinders 21, to which the manifold 85 is secured as by cap screws 90.

The sleeve valve 86 is synchronously rotated through a gear train comprising a pair of bevel gears 91 and 92 at the lower end of a diagonal shaft 93, and a pair of intermeshed spiral gears 94 and 95 adjacent the upper end of the diagonal shaft 93. The driving member 91 of the bevel gear pair 91—92 is coupled to the main crankshaft 52 by a crank 97, identical in all material respects to the drive crank 53 employed to drive the blower. As can be seen best in Figure 7, the driven spiral gear 95 is keyed to the stub shaft 100. Thus, as the engine operates, rotation of the spiral gear 95 rotates the sleeve 86 to intermittently place the ports 87 in alignment with the apertures 88 whereby to intermittently communicate the interior of the sleeve valve 86 with the cylinder 21 to inject an air-fuel mixture thereinto.

The key connection of the driven spiral gear 95 to the stub shaft 100 is such as to permit longitudinal movement of the gear on the shaft. A yoke 101 having terminal pins 102 engaged with a grooved collar 103 carried by the gear 95, permits longitudinal adjustment of the position of the gear 95 on the stub shaft 100. Manual adjustment of this position is accomplished by means of a lead screw 104 journalled in a bracket 105 and carrying a hand knob 106. The bracket 105 is formed as a part of a housing 108 which surrounds the diagonal shaft 93.

Due to the character of the spiral gears 94 and 95, and particularly the helical lead on the gear 95, the longitudinal movement effected by the adjustment 106—104, etc., changes the angular disposition of the valve 86 with respect to the main crankshaft 52. Thus, the fuel injection may be accurately timed to coincide with the optimum piston position, as will hereinafter be described.

*Ignition system*

The ignition system of the present engine is a more or less conventional dual spark plug system, the distributor being of conventional design indicated in the drawings by the reference character 110. The firing points 111 of the spark plugs are located in the upper domed portion 21a of the cylinders, in order to take full advantage of the fuel stratification feature later to be described. As can be seen best in Figure 2, the distributor 110 is carried on an upper extension of the housing 108 and is driven by an upward extension of the diagonal shaft 93. The timing of the spark is such that the cylinder charges are usually fired 10° to 20° ahead of top dead center. The exact firing position is subject to considerable variation affected primarily by the engine speed and the type of fuel used. The presently illustrated position is for a relatively fast burning fuel. Other details of the ignition system, being conventional, require no further detailed description herein.

*Crank and drive shaft design*

The main crankshaft 52 is journaled in a pair of ball or roller bearings 112 which are supported in appropriately aligned apertures 113 formed in downwardly extending lugs 114, which are parts of the main engine block 22. As can be seen best in Figure 3, the center line of the crankshaft 52 is slightly offset from the vertical axis of the cylinders 21. This amount of offset is indicated by the reference character X in Figure 3, and results in an asymmetrical cycle of port openings as will be described and as is indicated in Figure 9.

The details of construction of the crankshaft itself are best seen in Figure 8, which is an enlarged portion of Figure 3a. The crankshaft 52 is comprised of a pair of cranks 115, having tapered stub shafts 116 which are drawn tightly into appropriately tapered sockets in the opposite ends of a drive pinion 117, to which the stub shafts are also drivingly keyed by a longitudinal key 118. As can be seen in Figure 3a, the stub shafts 116 are held in their sockets in the pinion 117 by a longitudinal axial bolt 119 having a terminal nut 120.

It will be seen that the parts of the crankshaft thus far described are assembled by placing the pinion 117 between the bearings 112 and axially aligned therewith, and thereafter inserting the cranks 115 from opposite ends and securing them in place with the longitudinal bolt 119.

In order to be able to disassemble the crankshaft by forcing one of the stub shafts 116 out of its socket in the pinion 117, threaded counterbores 121 are formed in the cranks at the outer ends of the bore 122 in which the longitudinal bolt 119 is received. The disassembly procedure is illustrated in Figure 8, where it will be seen that, after removal of the bolt 119, a disassembly stud 123, having a threaded head 124, may be inserted from one end of the crankshaft, and a jackscrew 125 may be threaded into the counterbore 121 at the opposite end abutting the end of the stud 123, whereby to force one or the other of the stub shafts 116 out of the socket in the pinion 117. Having thus removed one of the cranks 115, the other crank, the pinion 117, and the intervening bearing 112 may all be removed through the aperture 113.

The main propeller shaft of the engine projects from the forward end thereof, is positioned directly below the crankshaft 52, and is identified in the drawings by the reference character 130. The propeller shaft 130 is journaled in bearings 131 which are in turn supported in appropriate apertures in a lower housing or crankcase portion 133 formed on the under side of the engine block 22.

The propeller shaft 130 carries a spur gear 134 at its rearward end which is meshed with the pinion 117 so as to drive the shaft at a reduced rate, the ratio in the present instance being approximately 1:2.

Secured to the rearward vertical surface of the crankcase 133 are a number of oil pumps 136, which are of conventional gear type and are driven by a small rearward extension 138 of the propeller shaft 130. Oil is picked up from a sump 140 and delivered through various oil pressure lines 141, 142, etc., to the different parts of the engine requiring oil pressure lubrication. Oil spray nozzles are located at various points in the mechanism, as for example, the crank and gear lubrication nozzle 145, illustrated in Figure 3, which sprays oil upwardly at 147 to lubricate the wrist pin 146 and also downwardly to lubricate the crank bearings and the main gear drive comprising the pinion 117 and the gear 134. The spray 147 is of particular advantage in that it is directed against the piston head and cools the same.

Operation in general

Having described the mechanical features of the engine, the operating principles will now be explained.

The sequence of events prior to combustion will be described first. Starting is accomplished by rotating the crank shaft 52 with an electrical, compressed air, or other conventional starter (not shown). Starting rotation of the engine immediately causes pressure to be developed in the blower 40, thus providing compressed air for scavenging and fuelizing. Pressure is also built up in the oil and fuel pumps 136 and 70, respectively, thus starting the circulation of lubricating oil and delivering liquid fuel under pressure to the fuelizer 68.

Opening the fuel valve 78—79 under these conditions introduces a continuously metered jet of liquid fuel into the Venturi 77 of the fuelizer 68 where it is broken up into a finely atomized spray by the high velocity charge-air with which it combines to form a highly saturated vapor. This over-rich mixture passes on to the chamber within the rotary valve 86 in readiness for admission to the cylinder where it further combines with scavenging air within the cylinder to form a combustible mixture.

The sequence of events comprising the firing cycle of the given cylinder under typical adjustment of the controls hereinafter to be described, is illustrated in Figure 9. The angles noted are for illustration only, and are not to be considered as limitations.

Commencing with the firing of the cylinder, some 10° to 20° in advance of top dead center, the next event to take place as the piston 20 moves downwardly on the power stroke, is the uncovering by the piston of the charge inlet ports 89. The ports 89 are thereafter open and under the control of the rotary valve 86, as will be explained later herein, until they are again closed by the piston on its return stroke.

The next occurrence is the opening of the exhaust ports 36 by the piston moving down past the same. Shortly thereafter the piston moves down sufficiently far to open the scavenging ports 35, the period intervening between the opening of the exhaust ports and the opening of the scavenging ports, being termed the "exhaust blow-down," i. e., that period during which the exhaust gases are expelled under their own pressure and the cylinder pressure is reduced to substantially atmospheric.

Note that due to the offset position of the crankshaft (indicated at X), the timing of the port opening and closing on the respective down and up strokes of the piston is altered and there is a shift in the angular position of these occurences within the cycle, as illustrated in Figure 9. This results in a longer expansion stroke and longer "full open port" than would be the case if the crankshaft were directly below the piston axis. This increased "port-open period" permits the use of smaller exhaust ports, improves the scavenging efficiency, and aids in cooling the piston head due to the relatively long "dwell" near bottom dead center.

The scavenging, and fuel-air throttles 60b and 67a are cooperatively connected to the fuel metering control 80 through mechanical or other known linkage, indicated schematically at 69. The linkage means 69 includes mechanical cams or similar elements by which the amount of air passing through the throttles 60b and 67a is synchronized with the fuel flow rate at a predetermined ratio corresponding to the various conditions of engine speed, load, altitude, and temperature. Inasmuch as mechanical linkages for accomplishing the foregoing coordination of throttles and control valves are known, and inasmuch as the specific construction of such linkage does not form a part of the present invention, no further description thereof is deemed necessary herein.

Since the power of any internal combustion engine is directly related to the amount of mixture burned in a given interval of time, it therefore depends upon the amount of air (and fuel) introduced into the system in such interval of time, and may be controlled by varying the unit air charge, i. e., the weight of fresh air admitted into the cylinder per stroke. In the present engine, the aforesaid control is effected in substantial measure by the position of the throttle 60b which regulates the scavenging ratio (ratio of fresh air introduced per stroke to the total cylinder displacement). As previously explained, the scavenging throttle 60b is mechanically linked to the fuel-air throttle 67a; hence the latter is seen to be the master control.

Maximum power will be obtained when the unit charge completely fills the combustion chamber, but for partial load operation, a portion only of the full load requirements is utilized. Throttling the flow of scavenging will result in relatively incomplete scavenging with the result that the contents of the combustion chamber 21a prior to the introduction of the fuel charge will consist in part of fresh air, and in part of the products of combustion of the preceding cycle. The purpose and advantage of this condition will be explained later herein.

As a result of the "loop" scavenging system previously described, a large porportion of the fresh air introduced will be forced into the upper portion of the combustion chamber 21a while the residuum of burned gases will be displaced downwardly and toward the exhaust ports 36.

Near the end of the scavenging period, the rotary valve 86 opens to admit the fuel-charge, consisting of an over-rich mixture of finely atomized particles of fuel and air. It will appear from the foregoing description of the scavenging operations, that at or about the time the charge inlets are opened by the operation of the rotary valve 86, the piston will, as previously described, have moved up, partially obscuring the scavenging ports 35 so as to deflect the stream of scavenging air upward toward the combustion chamber 21a. The high speed jet of fuel-charge admitted through the inclined passageways 89 by the opening of the rotary valve 86 mingles with the scavenging flow to form a highly turbulent stream as it is carried upwardly through a "loop" pattern into the combustion chamber 21a adjacent the spark plug 111. As the flow traverses the dome-shaped chamber 21a, it tends to move downwardly on the opposite side of the cylinder toward the exhaust ports 36. However, due to the finite period of time required to traverse the loop path, the upward motion of the piston seals the exhaust ports 36 in time to prevent the escape of any appreciable amount of fuel-charge mixture.

Several distinct advantages result from the mode of fuel introduction just described. The movement and change of direction of the high speed fuel-air charge in the loop pattern of the scavenging air, creates a very turbulent condition which scours away the boundary layer of quiescent gases which tend to cling to the cylinder walls, thus insuring a homogeneous combustible mixture. Also, a more complete vaporization of the fuel occurs during the compression stroke, thus reducing the compression temperatures due to absorption by the gases of heat of vaporization. These features tend to increase the speed of flame propagation resulting in improved thermal efficiency. At the same time, the rapid flame propagation insures a combustion of the fuel-charge as opposed to spontaneous ignition and detonation, which cause knocking.

Thus, it is seen that at full throttle, the cylinders will be fully charged with a relatively cool homogeneous but highly turbulent fuel-air mixture. The proportions of this mixture are automatically regulated to meet the varying demands of the engine by the linkage means previously referred to. As compared to a conventional carburetor engine, the present design exhibits the following advantages:

1. A higher specific power output by virtue of increased volumetric efficiency resulting from the elimination of carburetor pressure losses and the absence of manifold heating;

2. Easier starting, due to more complete vaporization of fuel and the concentration of richer portions of the mixture in the immediate vicinity of the spark plug 111;

3. Faster acceleration, due to elimination of the normal time lag inherent in conventional manifold systems;

4. Elimination of icing conditions attendant upon conventional carburetor and manifold installations;

5. Elimination of vapor lock due to the introduction of liquid fuel under positive pressure at all times;

6. Better cooling, due to vaporization of fuel taking place without the addition of heat in the fuelizer, and also during the compression stroke, thus reducing compression temperatures;

7. Reduced detonation, due to the cooler charge and increased speed of flame propagation with an attendant decrease in spontaneous ignition, thus permitting the use of lower octane fuels and higher compression ratios; and 8. Elimination of backfiring due to the fact that none of the intake passages contain a highly combustible mixture.

In part-throttle operation, as previously explained, a portion of the products of combustion of the preceding cycle will remain in the cylinder and these products will intermingle with the turbulent charge of fresh scavenging air and fuel-charge air in such a manner as to form zones of varying fuel-air ratio. These zones are vertically stratified in the combustion chamber 21a, the richer portions being located in the upper region surrounding the spark plug 111 and the leaner portions in the lower part of the cylinder. Due to such stratification, a rich combustible mixture will always surround the spark plug at the instant of firing, whether the engine is at the moment operating at full or partial throttle, thus insuring easy starting and permitting the use of relatively lean overall fuel-air ratios, resulting in low fuel consumption at part loads approaching the ideal air-standard efficiency. Since the end gas (that remote from the flame origin) is a relatively non-combustible mixture, the tendency to knock and the adverse effects of knocking are substantially eliminated.

*Supercharging*

Supercharging in the present engine is chiefly accomplished by increasing the pressure of the charge air introduced with the fuel, thus increasing the mass and density of the content of the cylinder prior to ignition. Referring to the porting diagram, Figure 9, it is seen that the theoretically possible supercharging period extends from the point of closure to the exhaust port to the closure of the fuel inlet port by the piston on its compression stroke. The actual supercharging period, however, will be limited by the fuel inlet timing which in turn may be regulated by the rotary valve adjustment accomplished by the mechanism illustrated in Figure 7. As the pressure of the incoming charge is controlled by the fuel throttle 67a and the volume of admitted charge is controlled by the rotary valve 86, it will be seen that variation of the degree of supercharging is accomplished by cooperation of the rotary valve timing and the throttle valve 67a.

In the present engine, supercharging is employed in the conventional manner to maintain sea-level conditions at various altitudes at which the engine may operate, and is also employed for the purpose of increasing the engine torque at low speeds at a given constant altitude. The altitude adjustment is accomplished by means of a conventional altitude pressure-sensing device (not shown) which is connected to actuate the pressure relief valve 60a, as previously explained. Supercharging to increase torque at constant altitude is accomplished by means of a governing device (not shown) which actuates throttles 60b and 67a as may be required to maintain a predetermined engine speed under varying load conditions.

Finally, an overriding linkage (not shown) may be employed if desired to make minor synchronous adjustments in the ignition timing and in the fuel flow for the purpose of maintaining a predetermined fuel-air ratio as the air intake is varied.

The aforementioned variation in torque at lower rotational speeds eliminates the necessity of speed-reducing transmissions for starting loads or the increase in propulsion efficiency of fixed propellers during the take off and climbing phases of operation.

While the engine shown and described is fully capable of achieving the objects and providing the advantages hereinbefore stated, it is capable of considerable modification without departing from the spirit of the invention. For this reason, we do not mean to be limited to the form shown and described, but rather to the scope of the appended claims.

We claim:

1. A two-stroke-cycle internal combustion engine comprising, in combination: an engine block having a vertical cylinder-receiving bore with an upwardly opening annular enlargement therein; a cylinder seated in said bore and having a dependent skirt extending to the bottom of said enlargement and a flange closing the upper mouth of said bore whereby to form with said enlargment an annular plenum chamber surrounding said skirt; an upwardly convex head closing the upper end of said cylinder and having a spark plug mounted therein to ignite combustible gaseous fuel in said cylinder; a reciprocable piston in said cylinder; a crank journaled in said block on a horizontal axis offset from the vertical axis of said cylinder; a connecting rod between said piston and crank to rotate the crank upon reciprocation of the piston; an exhaust port in the side wall of said cylinder opposite the direction of offset of said crank axis and positioned adjacent the lower end of the stroke of said piston whereby to be covered by said piston during all of the operating cycle thereof except for a relatively short period when the piston is near the lower end of its stroke; a scavenging air inelt port in the side wall of said cylinder substantially diametrically opposite said exhaust port; an upwardly sloping passage between said plenum chamber and scavenging air port to admit air from said chamber into said cylinder in an upwardly directed stream toward said head; means forming a horizontal rotary valve bore adjacent an outer wall of said cylinder; a fuel-air passage intercommunicating said valve bore and cylinder and terminating in a fuel-air port vertically aligned above said scavenging air port; a valve tube rotatably and sealably supported in said valve bore and having a lateral aperture positioned to align intermittently with said fuel-air passage as said valve tube is rotated whereby alternately to open and close said fuel air passage, the size of said aperture being such as to make the open period a relatively small fraction of the total rotary cycle of said valve tube; drive means interconnecting said crank and valve tube to rotate the latter in synchronism with said piston reciprocations to open said fuel-air passage once for a relatively short period of time during each upward stroke of said piston and while said scavenging air inlet port is uncovered; a first stage rotary compressor driven by said crank and connected to deliver compressed air at a first pressure to said plenum chamber; a second stage rotary compressor driven by said crank and connected to deliver compressed air at a second relatively higher pressure into said valve tube for controlled delivery to said cylinder; and, a fuelizer interposed in the path of air from said second stage compressor to said valve tube to introduce atomized fuel into said second stage air to form an over-rich fuel-air mixture therewith.

2. The construction of claim 1 further characterized by having valve timing means interposed in said drive means to advance or retard the instant of opening of said fuel-air passage with respect to the beginning of the upward stroke of said piston.

3. The construction of claim 1 further characterized by having separate throttles in the outputs of said respective compressors and having a coordinating control linkage interconnected between said throttles.

4. The construction of claim 3 further characterized by having a third throttle in said fuel introducing means connected to be actuated by said control linkage whereby to regulate the relative proportion of atomized fuel introduced into said second stage air at various throttle settings of said engine.

References Cited in the file of this patent

UNITED STATES PATENTS

| 792,615 | Ramsey | June 20, 1905 |
| 888,374 | Westendarp | May 19, 1908 |
| 976,858 | Easthope, Jr. | Nov. 29, 1910 |
| 1,021,697 | Mort | Mar. 26, 1912 |
| 1,022,178 | Brazelle | Apr. 2, 1912 |
| 1,299,895 | Anderson | Apr. 8, 1919 |
| 1,342,483 | Wickwire | June 8, 1920 |
| 1,745,824 | Zoller | Feb. 4, 1930 |
| 2,189,106 | Garve et al. | Feb. 6, 1940 |
| 2,270,546 | Neuland | Jan. 20, 1942 |

FOREIGN PATENTS

| 483,214 | France | Mar. 17, 1917 |